United States Patent Office 3,258,437
Patented June 28, 1966

3,258,437
POLYMERIZATION OF DIENES IN THE PRESENCE OF AN AMINE OR AMMONIA SALT AND PRODUCT THEREOF
Rolland I. Peters, Detroit, Mich., and Roger M. Christenson, Gibsonia, and Donald P. Hart, Allison Park, Pa., assignors to Pittsburgh Plate Glass Company, Pittsburgh, Pa., a corporation of Pennsylvania
No Drawing. Filed June 5, 1961, Ser. No. 114,666
16 Claims. (Cl. 260—22)

This invention relates to a new method of preparing polymers in an aqueous medium. More particularly, this invention relates to polymerization of dienes in the presence of a salt of an adduct of a drying oil or a long oil alkyd and an unsaturated dicarboxylic anhydride or acid and to the products prepared thereby.

In U.S. Patent 2,941,968 it is disclosed that certain polymers of styrene which have been prepared in the presence of an aqueous medium containing the salt of an adduct of a drying oil and maleic anhydride or any other unsaturated dicarboxylic acid or anhydride can be advantageously employed in coating compositions or film-forming compositions.

While this method of polymerization has been extended to many other ethylenically unsaturated compounds containing the $CH_2=C<$ group, dienes such as butadiene and isoprene have not been polymerized in the presence of the above-mentioned salts of the adducts of a drying oil and unsaturated dicarboxylic acid or anhydride. It was through that the polymerization of dienes in the presence of the said adducts would be unsuccessful because these said adducts were considered to contain the structure

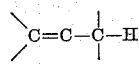

In two articles by Robert L. Frank et al., Industrial and Engineering Chemistry, volume 39, pages 887 and 893, July 1949, there are listed various impurities which inhibited polymerization of certain dienes, such as isoprene and butadiene, particularly when copolymerized with styrene. Frank et al. found that many of the polymerization retarders contained the

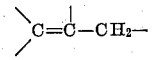

group or the

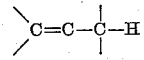

group, the latter being the stronger polymerization retarder of two.

Contrary to the teachings of the above articles, however, it has now been found not only that dienes can be made to polymerize in the presence of the salts of the adducts of drying oils or a long oil alkyd and maleic acid or anhydride which contain the inhibiting structure, but that the products which are obtained thereby have outstanding properties from both the standpoint of utility and from the standpoint of commercial adaptability.

It has been found that the compositions of the instant invention unexpectedly act more as solution polymerized compositions rather than emulsion polymerized compositions. For example, they are surprisingly transparent and homogeneous; they are not water sensitive after baking as are most true emulsion polymerized compositions, and they are also found to be stable as opposed to most polymeric emulsion systems which are inherently unstable.

The process of the instant invention is carried out by polymerizing a diene such as butadiene or isoprene in the presence of an amine or ammonia salt of an adduct of a drying oil or a long oil alkyd and a dicarboxylic acid or anhydride. The resulting product is a clear, stable composition which when drawn down as a film is transparent and after curing has extremely good film integrity and water insensitivity. While the polymerization technique is similar to standard emulsion preparations, the resulting product is stable and is capable of much higher pigment loading than those polymeric preparations prepared by standard emulsion polymerization.

The advantages of the instant invention are obvious, since the usual emulsion prepared polymeric compositions do not ordinarily find utility as such because of the instability of the emulsion medium. Moreover, the emulsion cannot be used per se in many of the areas where a solution polymerized polymeric composition can be used, since emulsions by their very nature are heterogeneous in structure and form films and coatings from the aggregate of discrete particles dispersed therein and therefore do not ordinarily have good integrity. Moreover, in accordance with the instant invention, the emulsifier (that is, the salt of the adduct of a drying oil or a long oil alkyd with the unsaturated dicarboxylic acid or anhydride) becomes an integral part of the film by forming an interpolymer with the diene component, which interpolymer is relatively water insensitive. The emulsifier or surface active agent which is used in the ordinary emulsion polymerizations is not generally a film-forming material and its presence is undesirable because of the water sensitivity which is imparted to the coating composition.

The resinous compositions of the instant invention are prepared simply by admixing the diene or the diene plus an ethylenically unsaturated monomer containing the $CH_2=C<$ radical in water with a free radical type catalyst and an amine or ammonia solubilized salt of an adduct of a drying oil or a long oil alkyd and a dicarboxylic acid or anhydride. The reaction mass is then heated for a period of from about 2 to 20 hours.

In order to obtain a product which is essentially transparent and has the properties of a solution polymerized system, it is desirable that the salt of the adduct of the drying oil or a long oil alkyd and dicarboxylic acid or anhydride be present in amounts of at least 20 percent by weight of the total reactants; it is preferred, however, that at least 25 percent be used. While there is usually no advantage in using more than about 50 percent by weight of the total reactants of the said adducts, it has been found that useful compositions may be prepared utilizing 5 or 10 times as much of the said adduct or the reactive monomers.

The various dienes which may advantageously be empolyed for the preparation of polymers of the instant invention include in addition to butadiene and isoprene most of the di-unsaturated members of the alkylidene series including both the unsubstituted and substituted conjugated diolefins. The substituted diolefins may be those containing lower alkyl groups or halogen groups (chlorine, fluorine, bromine and iodine) directly bonded to the alkylidene chain. Representative examples of these diolefins include chloroprene, 2,3-dimethyl butadiene and myrcene and the like.

It has been found in numerous instances that advantages can be obtained by copolymerizing vinyl monomers with the above-mentioned dienes. Any one of the ethylenically unsaturated monomers containing the

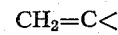

group can be present in amounts ranging up to 90 percent by weight of the reactive monomer components.

Examples of vinyl monomers which may be used in preparing the copolymers of the instant invention are set forth as follows:

(1) Monoolefinic hydrocarbons, that is, monomers containing only atoms of hydrogen and carbon, such as Styrene,
Alpha-methyl styrene,
Alpha-ethyl styrene,
Alpha-butyl styrene,
Isobutylene (2-methyl propene-1),
2-methyl-butene-1,
2-methyl-pentene-1,
2,3-dimethyl-butene-1,
2,3-dimethyl-pentene-1,
2,4-dimethyl-pentene-1,
2,3,3-trimethyl-butene-1,
2-methyl-heptene-1,
2,3-dimethyl-hexene-1,
2,4-dimethyl-hexene-1,
2,5-dimethyl-hexene-1,
2-methyl-3-ethyl-pentene-1,
2,3,3-trimethyl-pentene-1,
2,3,4-trimethyl-pentene-1,
2,4,4-trimethyl-pentene-1,
2-methyl-octene-1,
2,6-dimethyl-heptene-1,
2,6-dimethyl-octene-1,
2,3-dimethyl-decene-1,
2-methyl-nonadecene-1,
Ethylene,
Propylene,
Butylene,
Amylene,
Hexylene, and the like;

(2) Halogenated monoolefinic hydrocarbons, that is, monomers containing carbon, hydrogen and one or more halogen atoms, such as Alpha-chlorostyrene,
Alpha-bromostyrene,
2,5-dichlorostyrene,
2,5-dibromostyrene,
3,4-dichlorostyrene,
3,4-difluorostyrene, ortho-, meta-, and Para-fluorostyrenes;
2,6-dichlorostyrene,
2,6-difluorostyrene,
3-fluoro-4-chlorostyrene,
3-chloro-4-fluorostyrene,
2,4,5-trichlorostyrene,
Dichloromonofluorostyrenes,
2-chloropropene,
2-chlorobutene,
2-chloropentene,
2-chlorohexene,
2-chloroheptene,
2-bromobutene,
2-bromoheptene,
2-fluorobutene,
2-iodopropene,
2-iodopentene,
4-bromoheptene,
4-chloroheptene,
4-fluoroheptene,
Cis and trans-1,2-dichloroethylenes,
1,2-dibromoethylene,
1,2-difluoroethylene,
1,2-diiodoethylene,
Chloroethylene (vinyl chloride),
1,1-dichloroethylene (vinylidene chloride),
Bromoethylene,
Fluoroethylene,
Iodoethylene,
1,1-dibromoethylene,
1,1-fluoroethylene,
1,1-diiodoethylene,
1,1,2,3,-tetrachloroethylene,
1,1,2,2-tetrachloroethylene, and 1-chloro-2,2,2-trichloroethylene;

(3) Esters of organic and inorganic acids, such as

Vinyl acetate,
Vinyl propionate,
Vinyl butyrate,
Vinyl isobutyrate,
Vinyl valerate,
Vinyl caproate,
Vinyl enanthate,
Vinyl benzoate,
Vinyl toluate,
Vinyl p-chlorobenzoate,
Vinyl o-chlorobenzoate,
Vinyl m-chlorobenzoate, and similar Vinyl halobenzoates,
Vinyl p-methoxybenzoate,
Vinyl o-methoxybenzoate,
Vinyl p-ethoxybenzoate,
Methyl methacrylate,
Propyl methacrylate,
Ethyl methacrylate,
Butyl methacrylate,
Amyl methacrylate,
Hexyl methacrylate,
Heptyl methacrylate,
Octyl methacrylate,
Decyl methacrylate,
Methyl crotonate,
Ethyl crotonate,
Ethyl tiglate;

and

Methyl acrylate,
Ethyl acrylate,
Propyl acrylate,
Isopropyl acrylate,
Butyl acrylate,
Isobutyl acrylate,
Amyl acrylate,
Hexyl acrylate,
2-ethylhexyl acrylate,
Heptyl acrylate,
Octyl acrylate,
3,5,5-trimethylhexyl acrylate,
Decyl acrylate,
Dodecyl acrylate;

and

Isopropenyl acetate,
Isopropenyl propionate,
Isopropenyl butyrate,
Isopropenyl isobutyrate,
Isopropenyl valerate,
Isopropenyl caproate,
Isopropenyl enanthate,
Isopropenyl benzoate,
Isopropenyl p-chlorobenzoate,
Isopropenyl o-chlorobenzoate,
Isopropenyl o-bromobenzoate,
Isopropenyl m-chlorobenzoate,
Isopropenyl toluate,
Isopropenyl alpha-chloroacetate,
Isopropenyl alpha-bromopropionate;

and

Vinyl alpha-chloroacetate,
Vinyl alpha-bromoacetate,
Vinyl alpha-chloropropionate, Vinyl alpha-bromopropionate,
Vinyl alpha-iodopropionate,
Vinyl alpha-chlorobutyrate,
Vinyl alpha-chlorovalerate,
Vinyl alpha-bromovalerate;

and

Allyl chloride,
Allyl cyanide,
Allyl bromide,
Allyl fluoride,
Allyl iodide,
Allyl chlorocarbonate,
Allyl nitrate,
Allyl thiocyanate,
Allyl formate,
Allyl acetate,
Allyl propionate,
Allyl butyrate,
Allyl valerate,
Allyl caproate,
Allyl 3,5,5-trimethyl-hexoate,
Allyl benzoate,
Allyl acrylate,
Allyl crotonate,
Allyl oleate,
Allyl chloroacetate,
Allyl trichloroacetate,
Allyl chloropropionate,
Allyl chlorovalerate,
Allyl lactate,
Allyl pyruvate,
Allyl aminoacetate,
Allyl acetoacetate,
Allyl thioacetate, as well as methallyl esters corresponding to the above allyl esters, as well as esters from such alkenyl alcohols as beta-ethyl allyl alcohol, beta-propyl allyl alcohols, 1-buten-4-ol, 2-methylbuten-4-ol, 2(2,2-dimethylpropyl)-1-buten-4-ol, and 1-pentene-4-ol;

Methyl alpha-chloroacrylate,
Methyl alpha-bromoacrylate,
Methyl alpha-fluoroacrylate,
Methyl alpha-iodoacrylate,
Ethyl alpha-chloroacrylate,
Propyl alpha-chloroacrylate,
Isopropyl alpha-bromoacrylate,
Amyl alpha-chloroacrylate,
Octyl alpha-chloroacrylate,
3,5,5-trimethylhexyl alpha-chloroacrylate,
Decyl alpha-chloroacrylate,
Methyl alpha-cyano acrylate,
Ethyl alpha-cyano acrylate,
Amyl alpha-cyano acrylate,
Decyl alpha-cyano acrylate;

and

Dimethyl maleate,
Diethyl maleate,
Diallyl maleate,
Dimethyl fumarate,
Diethyl fumarate,
Dimethylallyl fumarate, and Diethyl glutaconate;

(4) Organic nitriles, such as acrylonitrile, methacrylonitrile, ethacrylonitrile, 3-octenenitrile, crotonitrile, oleonitrile, and the like;

(5) Acid monomers, such as acrylic acid, methacrylic acid, crotonic acid, 3-butenoic acid, angelic acid, tiglic acid, and the like;

(6) The etherified aldehyde-modified unsaturated carboxylic acid amides such as N-butoxymethyl acrylamide, N-butoxymethyl methacrylamide and the other alkoxy derivatives such as the methoxy, ethoxy, propoxy, amyloxy and hexyloxy methyl acrylamides.

In preparing the adduct of the dicarboxylic acid anhydride and the drying oil, semi-drying oil or long oil alkyd, it is desirable that from 14 percent to 45 percent by weight of the unsaturated acid anhydride be reacted with from about 55 percent to 86 percent by weight of the drying or semi-drying oil. If less than 14 percent by weight of the unsaturated acid anhydride is employed, the adducts will be only partially water soluble unless water soluble organic solvents are employed to give water solubility. Even when so formulated with additives to give solutions in water, however, the adducts will not give films which possess the degree of hardness required in protective coatings for metallic surfaces, and may not have adequate corrosion resistance. If more than 45 percent of acid is utilized, films of the adduct will be seriously deficient in water resistance.

A second desirable but not essential requirement for the adduct is that it form a clear solution in water at a pH of 7.5 without the use of water soluble organic solvents such as alkylene glycol monoalkyl ethers which are ordinarily necessray to produce clear aqueous solutions of the oil adduct. In order to obtain such clear solutions at a pH of 7.5 without the use of solvents, it is necessary that the amount of alkaline materials employed to neutralize the adduct be such that substantially complete neutralization is achieved; that is, enough alkaline material should be employed to neutralize at least 70 percent of the acidity of the adduct. If less neutralization is obtained, a cloudy solution will result when the resin is added to water. Such resins will not have the stability and homogeneity necessary to give the excellent properties possessed by the compositions which are at least 70 percent neutralized.

As indicated hereinabove, oils with which the unsaturated dicarboxylic acid anhydrides or anhydride forming acids are reacted to form adducts which in turn can be neutralized to form useful water soluble resins are the drying oils, semi-drying oils and long oil alkyds. Generally, the drying oils are those oils which have an iodine value above about 130, and the semi-drying oils are those which have an iodine value of about 90 to 130 as determined by method ASTM-D 1467-57T. Included among these oils are linseed oil, soya oil, safflower, oil, perilla oil, tung oil, oiticica oil, poppyseed oil, sunflower oil, tall oil, walnut oil, dehydrated castor oil, herring oil, menhaden oil, sardine oil, and the like. Also included among such oils are those in which the oils per se are modified with other acids such as phthalic acid (or anhydride) or benzoic acid by first forming a di- or monoglyceride or a mixture thereof by alcoholysis, followed by esterification. Polyols other than glycerol can also be employed in the alcoholysis. Other esters of unsaturated fatty acids, for example, those prepared by the esterification of tall oil fatty acids with polyols are also useful. In addition, long oil alkyds having loy hydroxyl value (greater than 70 percent oil length) using the oils mentioned above are also useful. All of these materials can be reacted with unsaturated dicarboxylic acid anhydrides to give adducts useful in preparing the compositions of this invention.

The unsaturated dicarboxylic acid anhydride utilized in forming the adduct is an alpha, beta-ethylenically unsaturated dicarboxylic acid anhydride, such as maleic anhydride, itaconic anhydride, and others. Instead of the anhydride, it is also possible to utilize ethylenically unsaturated dicarboxylic acids which form anhydrides; for example, maleic acid or itaconic acid. These acids probably function by first forming the anhydride. Mixtures of the acids and anhydrides may also be utilized. Ordinarily the anhydride employed should contain from 4 to about 12 carbon atoms, although longer chain compounds can also be employed if desired.

The reaction with non-conjugated oils to form the adduct probably does not take place according to a true Diels-Alder type reaction in which conjugated double bonds must be present, but instead is believed to represent the reaction of an anhydride or acid with the methylene group adjacent to a non-conjugated double bond such as is present in linseed oil. This reaction may be represented as follows, wherein maleic anhydride is utilized for illustrative purposes:

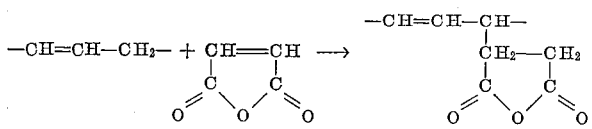

When conjugated oils such as tung oil are utilized, the reaction is probably of the Diels-Alder type.

The above reactions take place readily without the use of a catalyst and at temperatures in the range of about 100° C. to 300° C. or more, with most of the reaction occurring in the range of about 200° C. to 250° C. The reaction is ordinarily complete in less than three hours. The adduct obtained is insoluble in water.

The acidity of this adduct is then at least about 70 percent neutralized with ammonia or a water soluble amine or a quaternary ammonium hydroxide. Among the amines which may be utilized are the water soluble primary, secondary and tertiary amines such as methylamine, ethylamine, propylamine, dimethylamine, diethylamine, dipropylamine, dihexylamine, trimethylamine, triethylamine, tripropylamine, tributylamine, trihexylamine, monoethanolamine, monobutanolamine, diethanolamine, dibutanolamine, triethanolamine, tributanolamine and the like.

The quaternary ammonium hydroxides which may be employed include trimethylbenzyl ammonium hydroxide, triethylbenzyl ammonium hydroxide, trimethyllauryl ammonium hydroxide, triethyllauryl ammonium hydroxide, tributyllauryl ammonium hydroxide, and the like. For obvious reasons of economy, availability and ease of handling, ammonium hydroxide is the preferred neutralizing agent for the oil anhydride adduct.

Preferably, the pH of the neutralized and solubilized adduct should be maintained in the range of 7.5 to 9.0. If the pH is substantially lower than 7.5, the viscosity will be increased to the point that the material may be too viscous for practical use at a reasonable solids content, and if below 7.0 an unstable resin will result. However, it is an advantage of the materials described herein that the viscosity can readily be maintained within the desired range simply by adjustment of the pH to bring it within the 7.5 to 9.0 pH range.

It has also been found advantageous, although not essential, to add to the neutralized and solubilized adduct a small amount of an amino-alkyl-alkanediol such as 2-methyl-2-amino-1,3-propanediol, 2-ethyl-2-amino-1,3-propanediol, 2-methyl-2-amino-1,4-butanediol, or the like. While the diol obviously has some neutralizing effect, it has been found that it also produces a film with considerably increased hardness and improved water resistance, even though only small amounts are added. For example, optimum efficiency is achieved when only 4 percent by weight of the resinous components is used. Larger amounts have little or no effect on the properties of the film, whereas the water resistance appears to fall off slightly when amounts of less than about 4 percent are employed.

The following examples illustrate the preparation of the solubilized oil-anhydride adduct, and the use thereof in polymerizations of dienes. The examples are not intended to limit the invention, however, for there are obviously many possible variations and modifications.

Example I

Thirty and four-tenths (30.4) parts (76 percent) of linseed oil and 9.6 parts (24 percent) of maleic anhydride were placed in a reactor and heated to a temperature of 375° F. The heat was then turned off and since the reaction is strongly exothermic, the temperature rose to 475° F. After approximately 2½ hours, the reaction mixture was added with stirring to a mixture of 10.5 parts of 28 percent aqueous ammonium hydroxide and 1.88 parts of 2-methyl-2-amino-1,3-propanediol and 49.5 parts of water. The composition had a U–X viscosity on the Gardner-Holdt scale and a solids content of 43 percent. The Gardner color was 14–16 and the weight per gallon 8.7 pounds. The pH of the composition was 8.5. A sample of the resin formed a clear solution in water at a pH of 7.5 without the use of water soluble organic solvents.

Example II

A series of oil-anhydride adducts was prepared utilizing varying ratios of anhydride to oil. The reaction was carried out by heating the reaction mixture to 100° C., and then gradually allowing the temperature to increase to 250° C., where it was maintained for about 15 minutes. The reaction mixture was then allowed to cool and portions thereof neutralized with ammonium hydroxide, and in some instances with mixtures of ammonium hydroxide and 2-amino-2-methyl-1,3-propanediol. Water was added to give a desired viscosity and solids content. The pertinent data are set forth in the following table.

| Oil | Anhydride | Ratio Oil/Anhydride (Percent) | Resin Neutralized (Parts by Weight) | 28 Percent Ammonium Hydroxide Utilized (Parts by Weight) | 2-methyl-2-Amino-1,3-Propanediol (Parts by Weight) | Water Added (Parts by Weight) | Resin Solids | Gardner-Holdt Viscosity | pH |
|---|---|---|---|---|---|---|---|---|---|
| Linseed | Maleic Anhydride | 82.8/17.2 | 2,000 | 496 | | 1,504 | 48.1 | W | 9.1 |
| Do | do | 76/24 | 2,711 | 525 | 120 | 3,176 | 44.2 | U–X | 7.7 |
| Do | do | 67/33 | 1,200 | 446 | | 1,452 | 42.7 | V | 8.1 |
| Soya | do | 76/24 | 768 | 125 | 36 | 936 | 42.5 | $Z_1-Z_2$ | 7.7 |
| Tall Oil Fatty Acids-Trimethylol Ethane Ester | do | 76/24 | 704 | 135 | | 761 | 44.0 | $Z_6$ | 8.0 |
| Benzoic Acid Modified Linseed | do | 79/21 | 3,000 | 400 | 139 | 3,678 | 41.0 | $Z_1$ | 8.0 |

Each of the preceding resinous materials formed a clear solution in water at a pH of 7.5 without the use of water soluble organic solvents to obtain solubility and solution clarity.

Example III

Example I is repeated substituting maleic acid and itaconic acid respectively for the maleic anhydride. In each case a resin substantially equivalent to maleic anhydride product was obtained. Similar results are achieved when a mixture of maleic acid and maleic anhydride or a mixture of maleic anhydride and itaconic acid are utilized. Water is given off during the reaction of the acids with the oil, indicating that an anhydride forms.

Example IV

This example relates to the preparation of a salt of an adduct of maleic anhydride and linseed oil. The adduct as prepared in Example I (2500 parts) was charged at 200° C. into a vessel containing an aqueous solution consisting of 3500 parts water, 100 parts aminomethyl-1,3-propanediol and 400 parts of a 28 percent solution of ammonium hydroxide. The reaction mass was allowed to reach 85° C. maximum and cooled, after which 35 parts of the 28 percent ammonium hydroxide solution was added thereto. The resulting clear resinous composition had the following properties:

| | |
|---|---|
| Solids (percent) | 40.7 |
| Viscosity (Gardner-Holdt) | K |
| pH | 7.3 |

*Example V*

| | Parts by weight |
|---|---|
| Water | 200 |
| Resinous product of Example IV | 500 |
| Potassium persulfate | 2 |
| Ammonium hydroxide (28 percent) | 4 |
| Butadiene | 200 |

The above ingredients were charged into a pressure reactor and held at 75° C. for 16 hours. The resulting clear resinous product had the following properties:

| | |
|---|---|
| Solids (percent) | 44.1 |
| pH | 7.9 |
| Viscosity (No. 1 spindle 30 r.p.m., Brookfield Viscometer), cps. | 36 |

*Example VI*

| | Parts by weight |
|---|---|
| Styrene | 120 |
| Butadiene | 80 |
| Resinous product of Example IV | 500 |
| Water | 200 |
| Potassium persulfate | 2 |
| Ammonium hydroxide (28 percent solution) | 4 |

The above ingredients were charged into a pressure vessel and held at 78° C. for 16 hours. The resulting resinous product had the following properties:

| | |
|---|---|
| Solids (percent) | 44.4 |
| pH | 7.75 |
| Viscosity (No. 4 spindle 60 r.p.m., Brookfield Viscometer) cps. | 34 |

The above resinous composition was then adjusted to a pH of 9.0 with ammonium hydroxide. The viscosity of the resinous composition was then changed to 21 cps. The resinous composition was then drawn down on a steel panel and baked for one-half hour at 300° F. The cured film was clear, hard and solvent and alkali resistant.

*Example VII*

| | Parts by weight |
|---|---|
| Water | 200 |
| Potassium persulfate | 2 |
| Resinous product of Example IV | 500 |
| Butadiene | 100 |
| Acrylonitrile | 100 |

The above ingredients were charged into a pressure vessel and held at 78° C. for 16 hours. The resulting resinous composition had the following properties:

| | |
|---|---|
| Solids (percent) | 44.15 |
| pH | 7.2 |

The resinous composition was taken to a temperature below its freezing point and brought back to room temperature without any loss of stability of the system.

*Example VIII*

| | Parts by weight |
|---|---|
| Product of Example IV | 500 |
| Water | 150 |
| Potassium persulfate | 2 |
| Isoprene | 100 |
| Acrylonitrile | 100 |
| Ammonium hydroxide (28 percent solution) | 2 |

The above ingredients were charged into a flask equipped with stirrer, thermometer and condenser. The vessel was blown with inert gas for 2 minutes and heated with agitation to a temperature of about 30° C. The reaction was kept below the refluxing temperature of the monomer constituents for a period of one hour. The reaction temperature was then increased gradually over a four hour period to about 78.5° C. After the first half-hour, one-half of the solution consisting of 100 parts water and .2 part Formapon (sodium formaldehyde sulfoxylate) was added to the reaction mass. After another hour the remainder of the solution was added. After two and one-half hours the temperature reached 71° C. whereupon more catalyst (0.1 part potassium persulfate in 5 parts water) was added. Prior to the last one hour period of the reaction, a second addition of catalyst (0.1 part potassium persulfate in 5 parts water) was made. The resulting resinous product had the following properties:

| | |
|---|---|
| Solids (percent) | 39.4 |
| pH | 7.3 |
| Viscosity (No. 1 spindle 30 r.p.m., Brookfield Viscometer), cps. | 30 |

A film of the above composition was drawn down on a steel panel and baked at 350° F. for 20 minutes. The baked film had good solvent and alkali resistance.

*Example IX*

| | Parts by weight |
|---|---|
| Water | 300 |
| Resinous product of Example IV | 125 |
| Potassium persulfate | 2 |
| Ammonium hydroxide (28 percent solution) | 4 |
| Butadiene | 200 |

The above ingredients were charged into a pressure reactor and held at 75° C. for 16 hours. The resulting clear resinous product had the following properties:

| | |
|---|---|
| Solids (percent) | 40 |
| pH | 8 |
| Viscosity (No. 1 spindle 30 r.p.m., Brookfield Viscometer), cps. | 20 |

The above resinous composition was drawn down on glass and air-dried. After three days the film was hard and insensitive to water. A film containing 0.6 percent lead and .006 percent cobalt in the form of naphthenates air-dried completely to a hard water insensitive film overnight.

*Example X*

The following example relates to the preparation of a long oil alkyd.

| | Parts by weight |
|---|---|
| Linseed oil | 2550 |
| Trimethylol ethane | 159 |
| Litharge (PbO) | 1.5 |
| Phthalic anhydride | 209 |
| Benzoic acid | 126 |
| Xylene | 60 |

The linseed oil and trimethylol ethane were heated in a vessel equipped with thermometer, stirrer and condenser for 47 minutes to 392° F. and the litharge was added to the vessel. The reaction mixture was then heated to 460° F. and held for one hour, cooled to 440° F. and the phthalic anhydride and the benzoic acid were added with the xylene. The reaction mixture was then refluxed at 480° F. for three hours more. The resulting resinous composition had the following properties:

| | |
|---|---|
| Solids (percent) | 97.8 |
| Viscosity (Gardner-Holdt) | D |
| Acid No. | 13.95 |
| Density (wt./gal., lbs.) | 7.92 |
| Color (Gardner) | 10+ |

The above composition (1580 parts) was mixed in a vessel with 150 parts of maleic anhydride at a temperature of 400° F. After 19 minutes the reaction temperature rose to 408° F. and 150 parts more of maleic anhydride were added to the vessel. After 24 minutes a third and last addition of 150 parts of maleic anhydride was made, the reaction temperature being 404° F. The reaction temperature was gradually raised to 460° F. over a 52 minute period. The resulting resinous composition which was cut with water to 40 percent solids using 2592 parts H$_2$O and 430 parts NH$_4$OH had the following properties:

| | |
|---|---|
| Solids (percent) | 39 |
| Viscosity (Gardner-Holdt) | Z$_6$ |
| Solvent | H$_2$O |
| pH | 8.3 |
| Density (wt./gal., lbs.) | 8.70 |
| Color (Gardner) | 15+ |

*Example XI*

| | Parts by weight |
|---|---|
| Resinous product of Example X | 225 |
| Water | 315 |
| Ammonium hydroxide (28 percent solution) | 2 |
| Potassium persulfate | 2.1 |
| Butadiene | 210 |

The above ingredients were charged into a pressure vessel and held at 78° C. for 16 hours. The resulting resinous composition had the following properties:

| | |
|---|---|
| Solids (percent) | 39.8 |
| pH | 8.5 |
| Viscosity (No. 1 spindle 30 r.p.m., Brookfield Viscometer), cps. | 30 |

Five parts of the above polymer composition were extracted for 2 hours in a hot aliphatic hydrocarbon solvent, boiling point 202° F. to 258° F. (Skellysolve L). The sample was dried and weighed. The sample lost ony 0.18 part of its original weight, indicating that very little free polybutadiene was present. It therefore follows that the polybutadiene forms a reaction product with the adduct.

The instant invention includes all of the variations and modifications which fall within the scope of the appended claims.

We claim:

1. A method of producing a polymer of a diene which comprises carrying out the free-radical initiated polymerization of a diene in aqueous medium in the presence of at least about 20 percent by weight of an amine or ammonia salt of an adduct of (a) a member of the group consisting of a drying oil having an iodine value above about 90 and a long oil alkyd resin having an oil length greater than 70 percent, and (b) from about 14 percent to about 45 percent, based on the total weight of (a) and (b), of a member selected from the group consisting of an unsaturated dicarboxylic acid and an unsaturated dicarboxylic acid anhydride.

2. The method of claim 1 in which said member (b) is selected from the group consisting of maleic acid and maleic anhydride.

3. The method of claim 2 in which said diene is butadiene.

4. The method of claim 1 in which an aminoalkylalkane diol is added to said adduct.

5. A method of producing a polymer of a diene which comprises carrying out the free-radical initiated copolymerization of a diene and at least one other ethylenically unsaturated monomer in aqueous medium in the presence of at least about 20 percent by weight of an amine or ammonia salt of an adduct of (a) a member of the group consisting of a drying oil having an iodine value above about 90 and a long oil alkyd resin having an oil length greater than 70 percent, and (b) from about 14 percent to about 45 percent, based on the total weight of (a) and (b), of a member selected from the group consisting of an unsaturated dicarboxylic acid and an unsaturated dicarboxylic acid anhydride.

6. The method of claim 5 in which said diene is butadiene.

7. The method of claim 6 in which said other ethylenically unsaturated monomer is selected from the group consisting of styrene, acrylonitrile, methyl methacrylate, vinyl acetate and N-butoxymethyl acrylamide.

8. The method of claim 5 in which said diene is isoprene.

9. The method of claim 8 in which said other ethylenically unsaturated monomer is acrylonitrile.

10. The method of claim 5 in which said member (b) is selected from the group consisting of maleic acid and maleic anhydride.

11. An interpolymer of a diene and at least about 20 percent by weight of an amine or ammonia salt of an adduct of (a) a member selected from the group consisting of a drying oil having an iodine value above about 90 and a long oil alkyd resin having an oil length greater than 70 percent, and (b) from about 14 percent to about 45 percent, based on the total weight of (a) and (b), of a member selected from the group consisting of an unsaturated dicarboxylic acid and an unsaturated dicarboxylic acid anhydride, said interpolymer having been produced in aqueous medium and in a free-radical initiated reaction.

12. The interploymer of claim 11 in which said diene is butadiene.

13. The interpolymer of claim 11 in which said diene is isoprene.

14. The interpolymer of claim 11 in which said adduct is an adduct of linseed oil and a member selected from the group consisting of maleic acid and maleic anhydride.

15. The interpolymer of claim 11 containing at least one other ethylenically unsaturated monomer.

16. The interpolymer of claim 15 in which said diene is selected from the group consisting of butadiene and isoprene, said other ethylenically unsaturated monomer is selected from the group consisting of styrene, acrylonitrile, vinyl acetate and methyl methacrylate, and said adduct is an adduct of linseed oil and maleic anhydride.

References Cited by the Examiner

UNITED STATES PATENTS

| 2,366,313 | 1/1945 | Browning | 260—82.1 |
| 2,820,711 | 1/1958 | Kiebler et al. | 260—18 |
| 2,941,968 | 6/1960 | McKenna | 260—23 |
| 2,973,382 | 2/1961 | Dreher | 260—22 |

FOREIGN PATENTS

| 583,182 | 9/1959 | Canada. |
| 1,074,270 | 1/1960 | Germany. |
| 1,082,413 | 5/1960 | Germany. |

LEON J. BERCOVITZ, *Primary Examiner.*

MILTON STERMAN, *Examiner.*

R. W. GRIFFIN, *Assistant Examiner.*